United States Patent [19]
Tannenbaum

[11] Patent Number: 5,880,205
[45] Date of Patent: Mar. 9, 1999

[54] UNIVERSAL PRIMER FOR NON-STICK FINISH

[75] Inventor: Harvey Paul Tannenbaum, Wynnewood, Pa.

[73] Assignee: E. I. du Pont de Nemours and Company, Wilmington, Del.

[21] Appl. No.: 826,914

[22] Filed: Apr. 9, 1997

Related U.S. Application Data

[60] Provisional application No. 60/015,363, Apr. 12, 1996 and provisional application No. 60/017,054, Apr. 26, 1996.

[51] Int. Cl.$^6$ ........................................................ C08L 27/18
[52] U.S. Cl. ............................................ 524/520; 428/422
[58] Field of Search ............................................... 524/520

[56] References Cited

U.S. PATENT DOCUMENTS

| | | | |
|---|---|---|---|
| 4,139,576 | 2/1979 | Yoshimura | 525/189 |
| 4,395,445 | 7/1983 | Gebauer | 524/520 |
| 4,400,487 | 8/1983 | Stoneberg | 525/200 |
| 4,506,054 | 3/1985 | Vasta | 524/433 |
| 4,546,141 | 10/1985 | Gebauer | 524/508 |
| 4,557,977 | 12/1985 | Memmer | 524/520 |
| 4,645,440 | 2/1987 | Murata | 525/189 |
| 5,081,171 | 1/1992 | Nixon | 524/546 |
| 5,168,013 | 12/1992 | Tannenbaum | 524/514 |
| 5,168,107 | 12/1992 | Tannenbaum | 524/520 |
| 5,177,126 | 1/1993 | Moore | 523/458 |
| 5,218,031 | 6/1993 | Nayder | 524/462 |
| 5,250,356 | 10/1993 | Batzar | 428/458 |
| 5,346,727 | 9/1994 | Simkin | 525/198 |
| 5,356,971 | 10/1994 | Sagawa | 524/474 |
| 5,536,583 | 7/1996 | Roberts | 524/443 |

*Primary Examiner*—Paul R. Michl

[57] ABSTRACT

A primer layer composition for a non-stick coating on a smooth substrate consists essentially of polytetrafluoroethylene and polymer binder in a weight ratio of 0.2 to 1.4:1. Other fluoropolymer can be used, and the polymer binder can be a single polymer binder.

13 Claims, No Drawings

UNIVERSAL PRIMER FOR NON-STICK FINISH

CROSS-REFERENCE TO RELATED APPLICATIONS

This is application claims the benefit of priority of U.S. provisional applications Ser. No. 60/015,363, filed on Apr. 12, 1996 and Ser. No. 60/017,054, filed on Apr. 26, 1996.

FIELD OF THE INVENTION

This invention relates to primers for non-stick fluoropolymer coatings.

BACKGROUND OF THE INVENTION

U.S. Pat. No. 4,087,394 (Concannon) discloses an aqueous dispersion of certain fluoropolymers which contained dissolved film-forming material (binder) for forming a non-stick coating, the weight proportion of fluoropolymer-to-binder being 1.6:1. The dispersion was applied to a substrate such as aluminum sheet to provide a non-stick coating. The coating is disclosed to be a stratified composition, with the binder being concentrated at the substrate surface to provide adhesion of the coating to it and the fluoropolymer being concentrated at the outer surface to provide the release property. For adequate adhesion to the substrate, it became customary to grit-blast or otherwise roughen the substrate surface.

It became desirable to eliminate the step of roughening the substrate surface, requiring that the substrate receive multiple coatings of fluoropolymer, the first coat being the primer layer adhering the remaining layers to the substrate, e.g. the topcoat layer and possibly a midcoat layer between the primer layer and topcoat layer. Adequate adhesion to the smooth surface substrate was achieved by compositions which promoted stratification within the fluoropolymer/binder primer layer. In this case, the concentration of fluoropolymer away from the substrate surface had to provide adhesion to the fluoropolymer mid- or topcoat next applied.

Primer compositions promoting stratification are disclosed in U.S. Pat. Nos. 5,168,013 and 5,240,775 (both by Tannenbaum), the fluoropolymer component of the fluoropolymer/binder composition being the combination of polytetrafluoroethylene (PTFE) of low and high melt viscosity or of PTFE and TFE/perfluoro(alkyl vinyl ether) (PAVE) copolymer, respectively. PCT WO 94/14904 (Thomas) discloses the fluoropolymer component to be two different fluoropolymers, generally having a lower melt viscosity than the Tannenbaum PTFE and the binder component being the combination of two different binders of specified identity. The primers prepared in these references were applied to smooth, degreased aluminum and had fluoropolymer-to-binder ratios of 2.5, 2.4, and 1.5:1, respectively. In Thomas, the composition is applied by roller coating and cannot be applied by spray coating.

SUMMARY OF THE INVENTION

The present invention provides a fluoropolymer/binder composition which is sprayable onto a smooth substrate and bakeable to an adherent primer coating. It has been discovered that at sufficiently low fluoropolymer-to-binder weight ratios in the fluoropolymer/binder primer composition, adequate adhesion to smooth substrates can be obtained without using a combination of fluoropolymers which includes a low melt viscosity fluoropolymer to promote stratification within the primer layer. Nevertheless, the primer layer provides high adhesion to smooth substrates and the reduced amount of fluoropolymer present in the primer layer nevertheless provides high adhesion to the next-applied fluoropolymer layer.

Thus, the present invention can be described as a primer layer composition for non-stick coating on a smooth substrate, consisting essentially of fluoropolymer and polymer binder in the weight proportion of 0.2 to 1.4:1, based on the weight of the composition (primer layer) after baking.

In one embodiment, the fluoropolymer is polytetrafluoroethylene. Thus, the combination of high and low melt viscosity fluoropolymers which has heretofore been used to promote stratification is not present in this composition. Having determined that stratification is unnecessary at the low fluoropolymer weight ratios, it has also been determined that more than one fluoropolymer can be used in a particular primer composition. At the low weight ratios of fluoropolymer to polymer binder of the present invention, no appreciable stratification within the primer layer can be detected. For simplicity, however, the fluoropolymer component can be only one fluoropolymer. The high adhesion of the primer layer to the substrate and to the next-applied fluoropolymer layer manifests itself upon baking of the layers to fuse them, thereby forming a non-stick coating on the smooth substrate.

In other words, stratification which has heretofore been required in order for the primer to adhere to the substrate is not required in the present invention.

In another embodiment, the binder need only be a single binder, in contrast to the multiple binders required in Thomas. Thus, the primer composition of the present invention can consist essentially of the single fluoropolymer as described above and a single binder, to provide an effective, primer composition which can be economically applied to a wide variety of smooth substrates.

DETAILED DESCRIPTION OF THE INVENTION

The fluoropolymer component of the primer composition is preferably polytetrafluoroethylene (PTFE) having a melt viscosity of at least $1 \times 10^8$ Pa·s at 380° C. for simplicity in formulating the composition and the fact that PTFE has the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoropropylvinyl ether (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFEs having different melt viscosities can be used to form the fluoropolymer component. Use of a single fluoropolymer in the primer composition, which is the preferred condition, means that the fluoropolymer has a single chemical identity and melt viscosity. While PTFE is preferred, the fluoropolymer component can also be melt fabricable fluoropolymer, either combined (blended) with the PTFE, or in place thereof. Examples of such melt-fabricable fluoropolymers include TFE copolymers with one or more of the comonomers described above for the modified PTFE but having sufficient comonomer content to reduce the melting point significantly below that of PTFE. Commonly available melt-fabricable TFE copolymers include FEP (TFE/HFP copolymer) and PFA (TFE/PAVE copolymer), notably TFE/PPVE copolymer. The molecular weight of the melt-fabricable tetrafluoroethylene copolymers is unimportant except that it be sufficient to be film-forming and be able to sustain a molded shape so as to have integrity in the primer application. Typically, the melt viscosity of FEP and PFA will be at least $1\times10^2$ Pa·s and may range up to about $60-100\times10^3$ Pa·s as determined at 372° C. according to ASTM D-1238.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

The binder component is composed of polymer which is film-forming upon heating to fusion and is also thermally stable. This component is well known in primer applications for non-stick finishes, for adhering the fluoropolymer-containing primer layer to substrates and for film-forming within and as part of the primer layer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form.

An example of the binder component is polyamic acid salt which converts to polyamideimide upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Other binders that can be used include polyether sulfone and polyphenylene sulfide.

Whether the primer composition is applied as a liquid medium, wherein the liquid is water and/or organic solvent, the adhesion properties described above will manifest themselves upon drying and baking of the primer layer together with baking of the next-applied layer of fluoropolymer to form the non-stick coating of the substrate.

For simplicity, only one binder need be used to form the binder component of the composition of the present invention.

The proportion of fluoropolymer and binder in compositions of the present invention are preferably in the weight ratio of 0.5 to 1.2:1, although up to 1.4:1 operates quite well when the fluoropolymer component is solely PTFE (non-melt fabricable). The weight ratio can also be as low as 0.9:1, whereby the ratio ranges of 0.2 to 0.9:1 and 0.5 to 0.9:1 have present extremely small amounts of fluoropolymer relative to the amount of polymer binder present. The weight ratios of fluoropolymer to binder disclosed herein are based on the weight of these components in the primer layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will constitute about 5 to 50 wt % of the total dispersion.

The composition of the present invention can also be applied to substrates by conventional means. Spray application is the most convenient application methods and the only application method that can be used when the substrate is in a three dimensional form, such as preformed cookware or bakeware. An overcoat of one or more fluoropolymer-containing layers can then be applied by conventional methods to the primer layer prior to its drying. The overcoat can consist for example of a midcoat and a topcoat, with different compositions to provide the durability, non-stick and appearance effect desired. At least the midcoat would contain an inorganic film hardener such as a metal silicate, e.g. aluminum silicate, or metal oxide such as titanium dioxide to start the protection against scratching at a layer above the primer layer. Preferably, the primer composition also contains a small amount of inorganic film hardener, i.e. less than 5 wt % based on the baked weight of the fluoropolymer plus binder, more preferably, at least 0.5 wt % of the film hardener is present, and preferably, the amount of film hardener is 1 to 3 wt %. The same film hardener used in the midcoat can also be used in the primer layer composition.

The composition of the present invention in aqueous dispersion form may also contain such other additives as adhesion promoters, such as colloidal silica and a phosphate compound, such as metal phosphate, e.g. Zn, Mn, or Fe phosphate, the phosphate compound also being useful in the embodiment wherein the composition is in an organic solvent medium. The phosphate in combination with silicate film hardener provides appreciable improvement in the adhesion of the primer layer to the substrate. The amount of metal phosphate which can be advantageously used is about 1/10 to 1/2 the weight amount of the metal silicate.

When the primer and overcoat layer compositions are aqueous dispersions, the overcoat composition can be applied to the primer layer preferably after drying to touch. When the primer layer is made by applying the composition from an organic solvent, and the next layer (midcoat or topcoat) is applied from an aqueous medium, the primer layer should be dried so that all water incompatible solvent is removed before application of such next layer.

The resultant composite structure can be baked to fuse all the coatings at the same time to form the non-stick coating on the substrate. When the fluoropolymer is PTFE, a quick high bake temperature is preferred, e.g., for 5 min. at a temperature starting at 800° F. (427° C.) and rising to 825° F. (440° C.). When the fluoropolymer in the primer or the overcoat is a blend of PTFE and FEP, e.g., 50–70 wt % PTFE and 50–30 wt % FEP, the bake temperature may be reduced to 780° F. (415° C.), rising to 800° F. (427° C.) in 3 minutes (total bake time). The baked primer layer thickness will generally be between 2–10 micrometers, and the overcoat layer thickness will generally be from 10–20 micrometers for both the midcoat layer and the topcoat layer.

In the resultant composite structure, the substrate can be of any material which can withstand the bake temperature, such as metal and ceramics, examples of which include aluminum, anodized aluminum, cold-rolled steel, stainless steel, enamel, glass, and pyroceram. The substrate can be smooth, i.e. having a surface profile of less than 50 microinches (1.25 micrometers) as measured by a model RT 60 surface tester made by Alpa Co. of Milan, Italy, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum. The primer layer can be considered as the first fluoropolymer-containing layer on the substrate, and preferably the primer layer is directly bonded to the substrate.

Products have non-stick finishes made using primer compositions of the present invention include cookware, bakeware, rice cookers and inserts therefor, water pots, iron sole plates, conveyors, chutes, roll surfaces, cutting blades, etc.

In the following Examples, the general procedure described hereinafter was used. The substrates were all smooth, characterized by a surface profile of less than 50 microinches (1.25 micrometers), measured as described above. Durability and adhesion were measured by tests which discriminated between adequate and inadequate results for various coatings.

a. In the present case, durability was determined by the "tiger paw" abuse test wherein the coated substrate is continuously scratched with multiple ball point pen tips which are held by a weighted holder (400 g total weight) which rotates the pens against and around the surface of the coated substrate. To accelerate the failure of the entire thickness of the coating, i.e., the rotation of the pens produces a random circular progression around the pan generating abrasive action on the coating. The substrate is maintained at 205° C. during this scratch test to simulate actual cooking conditions and the time to reach a reproducible failure pattern (penetration of the entire coating on the substrate) is recorded. The longer the time to failure, the better the durability of the non-stick coating.

b. Adhesion of the primer layer to the substrate and to the overcoat was qualitatively determined first by the ability of the non-stick coating to remain tightly adhered to the substrate after baking and cooling, despite the stresses created by the coating wanting to shrink more than the substrate and second, by Post Water Adhesion (PWA) testing. PWA subjects the coated substrate to boiling water for 15 min. Upon cooling of the coated substrate to ambient temperature, a 10×10 matrix of one mm squares was cut in the coating down to the substrate, and pulls with adhesive tape were performed on the matrix in different directions. Removal of more than 3 squares would have been considered a failure. In addition, a line is cut in the coating down to the substrate and the film is subjected to mechanical force imparted by using one's fingernail to tear or pull back the coating. In this manner, a coating that had poor adhesion will be readily pulled back over ¼ in. (6.4 mm), otherwise the coating was considered to pass this test (Nail test). Intercoat adhesion can be detected by visual examination of the tear. In this manner, adhesion of the primer to the substrate and midcoat can be readily determined. All the testing was done with a midcoat and topcoat applied to the primer layer, all applications being done by spraying, followed by drying and baking. The midcoat had the composition which is essentially the same as set forth in Table 2 of U.S. Pat. No. 5,240,775, except that the 40.704 wt % of PTFE was a blend of 85 wt % PTFE and 15 wt % PFA. The topcoat composition was essentially the same as the topcoat composition set forth in the Table bridging cols. 2 and 3 of U.S. Pat. No. 5,250,356, except that the 71.5 wt % PTFE was a blend of 95 wt % PTFE and 5 wt % PFA.

d. The primer compositions used were in the form of an aqueous dispersion made by mixing a millbase composition with an aqueous dispersion of fluoropolymer. The resultant primer composition was then sprayed onto clean, smooth-surface aluminum panels and dried at 63° C. for 1 min. The panels were allowed to cool and then were resprayed first with a midcoat fluoropolymer aqueous dispersion and then with a topcoat fluoropolymer aqueous dispersion. The dried mid-and topcoat layers had thicknesses of 0.018 mm and 0.008 mm, respectively.

EXAMPLE 1

|  | Weight % |
|---|---|
| channel black pigment | 1.898 |
| ultramarine blue | 1.461 |
| aluminum silicate | 0.169 |
| PTFE* (solids basis) | 5.541 |
| LUDOX AM colloidal silica | 1.241 |
| polyamic acid salt** | 5.800 |
| Tamol (c) SN surfactant | 0.147 |
| deionized water | 71.183 |
| triethylanol amine | 0.071 |
| TRITON X100 surfactant | 1.256 |
| diethylanolamine | 0.818 |
| triethylamine | 1.636 |
| furfuryl alcohol | 4.976 |
| N-methylpyrrolidone | 3.802 |

*The PTFE has a melt viscosity exceeding $10^9$ Pa · s. The PTFE and AI-10 amounts are on a solids basis.
**of Amoco AI-10 (polyamideimide).

This primer composition was prepared in the form of an aqueous dispersion of the PTFE and other solids, with the polyamic acid salt being dissolved in the aqueous medium. The composition was coated onto smooth and anodized aluminum surfaces, and mid and topcoat compositions were applied and baked as described in the general procedure at 800° F. for 5 min. The baked coating thicknesses for the coatings were 0.3/0.7/0.3 mil (0.0076/0.018/0.0076 mm), respectively.

All of the samples so made passed the PWA and Nail tests. The coatings were also subjected to the tiger paw test, with the result that the coating on the smooth and anodized aluminum substrates lasted 1.9 and 1.3 times longer, respectively, than a commercial non-stick coating before failure. Excellent adhesion results can also be obtained when metal phosphate is used in addition to the above-mentioned ingredients in the primer composition, e.g. 0.42 wt % of ferric phosphate.

EXAMPLE 2

The general procedure for preparing a non-stick coating on smooth aluminum was followed using the following primer compositions:

|  | weight percent | | |
| --- | --- | --- | --- |
|  | (a) | (b) | (c) |
| AFFLAIR (c) 153 TiO$_2$ | 0.576 | 0.590 | 0.603 |
| ultramarine blue | 7.888 | 8.069 | 8.259 |
| PTFE (same as Example 1) | 4.035 | 2.751 | 1.408 |
| LUDOX AM | 1.177 | 1.204 | 1.232 |
| Amoco AI-10 | 5.637 | 5.766 | 5.901 |
| dionized water | 69.99 | 70.694 | 71.490 |
| TRITON X-100 | 0.285 | 0.209 | 0.129 |
| diethylanolamine | 0.795 | 0.813 | 0.832 |
| triethyl amine | 1.59 | 1.627 | 1.665 |
| furfuryl alcohol | 4.385 | 4.486 | 4.591 |
| N-methylpyrrolidone | 3.695 | 3.779 | 3.868 |

Compositions (a), (b), and (c) had the following fluoropolymer/polymer binder (PA-10) weight ratios: 0.71:1. 0.47:1, and 0.23:1, respectively. All these compositions passed the PWA and Nail tests.

What is claimed is:

1. Primer composition capable of adhering a non-stick coating on a smooth substrate surface, consisting essentially of polytetrafluoroethylene and polymer binder in a weight ratio of 0.2 to 1.4:1, based on the baked weight of said polytetrafluoroethylene plus said polymer binder, said polymer binder being polyamic acid salt, said polytetrafluoroethylene being a single polymer.

2. The primer composition of claim 1 and additionally inorganic film hardener being present in less than 5 wt % based on the baked weight of the composition.

3. The primer composition of claim 1 wherein said polymer binder is a single polymer binder.

4. The primer composition of claim 1 contained in a liquid medium.

5. A primer composition capable of adhering a non-stick coating to a smooth substrate consisting essentially of fluoropolymer and polymer binder in a weight ratio of 0.2 to 1.4:1 based on the baked weight of said fluoropolymer plus said polymer binder, said polymer binder being polyamic acid salt, said composition containing inorganic film hardener in a amount which is less than 5 wt % based on the combined weight of said fluoropolymer and polymer binder and metal phosphate compound.

6. The primer composition of claim 5 wherein said weight ratio is 0.5 to 1.2:1.

7. The primer composition of claim 5 wherein said weight ratio is 0.2 to 0.9.

8. A primer composition capable of adhering a non-stick coating to a smooth substrate consisting essentially of fluoropolymer and polymer binder in a weight ratio of 0.2 to 1.4:1 based on the baked weight of said fluoropolymer plus said polymer binder, said polymer binder being polyamic acid salt and said fluoropolymer being a single fluoropolymer.

9. Composite structure comprising a smooth substrate, a fused layer of the composition consisting essentially of polytetrafluoroethylene and polyamic acid salt polymer binder in a weight ratio of 0.2 to 1.4:1, based on the weight of said polytetrafluoroethylene and polymer binder, said polytetrafluoroethylene being a single polymer and said polymer binder being a single polymer binder in said composition, said composition having been sprayed onto and adhered to said substrate, and at least one fluoropolymer layer fused on top of and adhered to said layer of said composition to form a non-stick coating on said substrate.

10. Composite structure comprising a three-dimensional preformed smooth substrate, a fused layer of the composition of claim 5 adhered to said substrate, and at least one fluoropolymer layer fused on top of and adhered to said layer of composition of claim 6 to form a non-stick coating on said substrate.

11. The primer composition of claim 5 wherein said inorganic film hardener is metal silicate or metal oxide.

12. The primer composition of claim 1 in the form of an aqueous dispersion of said polytetrafluoroethylene, said polyamic acid salt being dissolved in the aqueous medium of said aqueous dispersion.

13. The primer composition of claim 12 in the form of a fused layer on a substrate, the baking of said composition causing said layer to fuse also causing said polyamic acid salt to convert to polyamideimide.

* * * * *